(12) United States Patent
Zimbeck et al.

(10) Patent No.: US 8,549,749 B2
(45) Date of Patent: Oct. 8, 2013

(54) EVAPORATORS FOR USE IN HEAT TRANSFER SYSTEMS, APPARATUS INCLUDING SUCH EVAPORATORS AND RELATED METHODS

(75) Inventors: Walter R. Zimbeck, Annapolis, MD (US); Edward J. Kroliczek, Davidsonville, MD (US); David C. Bugby, Vienna, VA (US)

(73) Assignee: Alliant Techsystems Inc., Arlington, VA (US)

( * ) Notice: Subject to any disclaimer, the term of this patent is extended or adjusted under 35 U.S.C. 154(b) by 38 days.

(21) Appl. No.: 12/960,298

(22) Filed: Dec. 3, 2010

(65) Prior Publication Data

US 2011/0075372 A1 Mar. 31, 2011

Related U.S. Application Data

(62) Division of application No. 11/257,396, filed on Oct. 25, 2005, now Pat. No. 7,848,624.

(60) Provisional application No. 60/621,539, filed on Oct. 25, 2004, provisional application No. 60/640,230, filed on Jan. 3, 2005.

(51) Int. Cl.
*B23P 6/00* (2006.01)

(52) U.S. Cl.
USPC .................................................. 29/890.032

(58) Field of Classification Search
USPC ................. 29/897.2, 890.032, 890.07
See application file for complete search history.

(56) References Cited

U.S. PATENT DOCUMENTS

| | | |
|---|---|---|
| 3,196,634 A | 7/1965 | Rich |
| 3,598,180 A | 8/1971 | Moore, Jr. |
| 3,661,202 A | 5/1972 | Moore, Jr. |
| 3,741,289 A | 6/1973 | Moore |
| 3,901,311 A | 8/1975 | Kosson et al. |
| 4,274,479 A | 6/1981 | Eastman |
| 4,765,396 A | 8/1988 | Seidenberg |
| 4,815,528 A | 3/1989 | Shaubach et al. |
| 4,883,116 A | 11/1989 | Seidenberg et al. |
| 4,934,160 A | 6/1990 | Mueller |
| 5,152,959 A | 10/1992 | Scorey |
| 5,303,768 A | 4/1994 | Alario et al. |
| 5,587,228 A | 12/1996 | Baker et al. |
| 5,692,095 A | 11/1997 | Young |
| 5,870,525 A | 2/1999 | Young |
| 6,162,046 A | 12/2000 | Young et al. |
| 6,241,008 B1 | 6/2001 | Dunbar |
| 6,347,936 B1 | 2/2002 | Young et al. |
| 6,382,309 B1 | 5/2002 | Kroliczek et al. |
| 6,391,251 B1 * | 5/2002 | Keicher et al. .................... 419/7 |

(Continued)

OTHER PUBLICATIONS

Occhionero et al., Aluminum Silicon Carbide (AlSiC) Thermal Management Packaging for High Density Packaging Applications, IAPS HDP and MCM's, Dever, CO, Apr. 6-9, 1999, 6 pages.

(Continued)

*Primary Examiner* — David Bryant
*Assistant Examiner* — Moshe Wilensky
(74) *Attorney, Agent, or Firm* — TraskBritt

(57) ABSTRACT

An evaporator includes a liquid barrier wall made of a ceramic material, a vapor barrier wall made of a ceramic material, and a wick made of a ceramic material and being positioned between the liquid barrier wall and the vapor barrier wall.

24 Claims, 14 Drawing Sheets

(56) References Cited

U.S. PATENT DOCUMENTS

| | | | |
|---|---|---|---|
| 6,585,509 | B2 | 7/2003 | Young et al. |
| 6,634,864 | B1 | 10/2003 | Young et al. |
| 6,668,912 | B2 | 12/2003 | Adams et al. |
| 6,768,751 | B2 | 7/2004 | Hoar |
| 6,863,117 | B2 | 3/2005 | Valenzuela |
| 6,880,625 | B2 | 4/2005 | Choi et al. |
| 6,892,799 | B2 | 5/2005 | Maydanik et al. |
| 7,011,146 | B2 * | 3/2006 | Wong ................ 165/104.33 |
| 7,028,759 | B2 | 4/2006 | Rosenfeld et al. |
| 7,191,820 | B2 | 3/2007 | Chou et al. |
| 7,431,570 | B2 | 10/2008 | Young |
| 2007/0284088 | A1 | 12/2007 | Chun |
| 2008/0283223 | A1 | 11/2008 | Chang et al. |

OTHER PUBLICATIONS

Ceramic Assembly, Corwil Technology Corporation, online prior to Oct. 25, 2004. http://www.corwil.com/ceramic/packages.html, 2 pages.

Configuration of Hermetic Packages, National semiconductor, online last modified Nov. 2002, http:www.national.com/quality/files/package_configuration_hermetic.pdf, 4 pages.

Hybrid Ceramic Substrates, CoorsTek Amazing Solutions, online prior to Oct. 25, 2004, http:/www.coorstek.com/electronics/ceramicsubstrates.asp, 3 pages.

About KAI, Kyocera, onlie Jan. 14, 2000, http://www.americas.kyocera.com/kai/semiparts/about/displaypress.cfm? key=71 (2 pages).

CFV Theory and Practice, Vapore, Inc.. online prior to Oct. 25, 2004, http://www.vaporeinc.com/cfvtheory.html, 2 pages.

How it Works, Vapore, Inc., online prior to Oct. 25, 2004, http://www.vaporeinc.com.cfvtechnology.html, 3 pages.

Copper Tungsten (Cu-W), Sumitomo Electric U.S.A., Inc., online prior to Oct. 25, 2004, http://www.sumitomoelectricusa.com/scripts/products/ts/hs_mat1.cfm, 1 page.

Bonded Fin Heat Sinks, Enertron, online prior to Oct. 25, 2004, http://www.enerton-inc.com/BondedFinHeatSink.html, 2 pages.

Heat Sinks—Laminated Sheets—Copper Composites—MarkeTech International Inc., online prior to Oct. 25, 2004, http://www.mkt-intl.com/tungsten/wcu.html, 2 pages.

Occhionero et al., Aluminum Silicon Carbide (AlSiC) Microprocessor Lids and Heat Sinks for Integrated Thermal Management Solutions, presented at the 2000 HDI Conference in Denver, CO, Apr. 26-28, 5 pages.

Occhionero et al., Aluminum Silicon Carbide (AlSiC) for Cost Effective Thermal Management and Functional Microelectronic Packaging Design Solutions, 12the European Microelectronics and Packaging Conference, Jun. 7-9, 1999, 8 pages.

Occhionero et al., Aluminum Silicon Carbide (AlSiC) Waveguide Substrate for Commercial Communications Application: A Case Study, Proceedings of the 26th Annual IMAPS NE Symposium, Andover, MA, May 1999, 20 pages.

Occhionero et al., Cost-Effective Manufacturing of Aluminum Silicon Carbide (AlSiC) Electronic Packages, Proceedings of the IMAPS Advanced Packaging Materials Symposium, Braselton, GA, Mar. 14-17, 1999, 7 pages.

Occhionero et al., A New Substrate for Electronic Packaging: Aluminum-Silicon Carbide (AlSiC) Composites, Proceedings of the 4th Annual Portable by Design Conference, Electronics Design, Mar. 24-27, 6 pages.

* cited by examiner

EVAPORATORS FOR USE IN HEAT TRANSFER SYSTEMS, APPARATUS INCLUDING SUCH EVAPORATORS AND RELATED METHODS

CROSS-REFERENCE TO RELATED APPLICATIONS

This application is a divisional of U.S. patent application Ser. No. 11/257,396, filed Oct. 25, 2005, now U.S. Pat. No. 7,848,624, issued Dec. 7, 2010, which claims the benefit of U.S. Provisional Application No. 60/621,539, filed Oct. 25, 2004, and U.S. Provisional Application No. 60/640,230, filed Jan. 3, 2005. The disclosure of each of which is hereby incorporated herein in their entirety by this reference.

TECHNICAL FIELD

This description relates to an evaporator for use in a passive two-phase loop heat transfer system.

BACKGROUND

Heat transfer systems are used to transport heat from one location (the heat source) to another location (the heat sink). Heat transfer systems can be used in terrestrial or extraterrestrial applications. For example, heat transfer systems can be used in electronic equipment, which often requires cooling during operation, which may or may not be integrated by satellite equipment that operates within zero- or low-gravity environments.

Loop Heat Pipes (LHPs) and Capillary Pumped Loops (CPLs) are examples of passive two-phase loop heat transfer systems. Each includes an evaporator thermally coupled to the heat source, a condenser thermally coupled to the heat sink, fluid that flows between the evaporator and the condenser, and a fluid reservoir for expansion of the fluid. The fluid within the heat transfer system can be referred to as the working fluid. The evaporator includes a primary wick and a core that includes a fluid flow passage. Heat acquired by the evaporator is transported to and discharged by the condenser. These systems utilize capillary pressure developed in a fine-pored wick within the evaporator to promote circulation of working fluid from the evaporator to the condenser and back to the evaporator. A characteristic that distinguishes an LHP and a CPL is the location of the loop's reservoir, which is used to store excess fluid displaced from the loop during operation. In general, the reservoir of a CPL is located remotely from the evaporator, while the reservoir of an LHP is co-located with the evaporator.

SUMMARY

In one general aspect, an evaporator includes a liquid barrier wall made of a ceramic material, a vapor barrier wall made of a ceramic material, and a wick made of a ceramic material and being positioned between the liquid barrier wall and the vapor barrier wall.

Implementations may include one or more of the following aspects. For example, the liquid barrier wall and the vapor barrier wall may be hermetically sealed to each other. The liquid barrier wall and the vapor barrier wall may be configured to uniformly contact the wick. The liquid barrier wall and the vapor barrier wall may be bonded to the wick.

The vapor barrier wall may have a flat geometry that is configured to engage a flat heat source.

The evaporator may also include a vapor channel at an interface between the wick and the vapor barrier wall. The vapor channel may be formed in the wick. The vapor channel may be formed in the vapor barrier wall. The vapor channel may be formed in both the wick and the vapor barrier wall.

The vapor barrier wall may be formed of a material with a thermal expansion coefficient that matches a thermal expansion coefficient of the heat source that is being cooled. The vapor barrier wall may include at least one of: aluminum oxide, silicon nitride, aluminum nitride, silicon carbide, beryllium oxide, and diamond.

The evaporator may also include a liquid channel at an interface between the wick and liquid barrier wall. The liquid channel may be formed in the wick. The liquid channel may be formed in the liquid barrier wall. The liquid channel may be formed in both the wick and the liquid barrier wall.

The liquid channel may have a trapezoidal shape along a cross-section normal to fluid flow to facilitate separation of vapor from liquid. The liquid barrier wall may be made of a low thermal conductivity material, such that heat transfer across the liquid barrier wall into the fluid is reduced. The liquid barrier wall may be made of at least one of aluminum oxide, silicon dioxide, zirconium oxide, glass, a glass ceramic, mullite, and a chemically bonded ceramic.

The wick may be made of a low thermal conductivity material, such that heat transfer across the wick into the liquid is reduced. The wick may be made of aluminum oxide, silicon dioxide, zirconium oxide, mullite, glass, glass ceramic, chemically bonded ceramic, or any mixtures thereof.

The liquid barrier wall may be made of a material that has an expansion coefficient that matches the expansion coefficient of the wick. The liquid barrier wall may be made of a material that has an expansion coefficient that matches the expansion coefficient of the vapor barrier wall. The liquid barrier wall may include a fluid inlet port and a fluid outlet port. The liquid barrier wall may include a fluid inlet port and a vapor outlet port. The liquid barrier wall may include a fluid outlet port.

The liquid barrier wall, the vapor barrier wall, and the wick may be cylindrical along a cross-section that is normal to fluid flow. Or, the liquid barrier wall, the vapor barrier wall, and the wick may be polygonal along a cross-section that is normal to fluid flow.

The wick may include a vapor side part and a liquid side part that has a thermal conductivity lower than the thermal conductivity of the vapor side part and that has a pore size that is larger than the pore size of the vapor side part. The vapor side part may have a pore size in a range of about 1 µm to 10 µm. The liquid side part may have a pore size in the range of about 10 µm to 20 µm.

In another general aspect, an evaporator includes a barrier wall made of a ceramic material, wherein the barrier wall contains a fluid, and a wick made of a ceramic material. The evaporator is positioned adjacent the barrier wall.

Implementations may include one or more of the following features. For example, the barrier wall may be configured to uniformly contact the wick. The barrier wall may be uniformly bonded to the wick. The barrier wall may include a vapor barrier wall configured to receive a heat source and contain vapor. The barrier wall may include a liquid barrier wall that contains liquid. The barrier wall may be electrically insulating.

The wick may be electrically insulating.

In another general aspect, an evaporator is made by bonding a ceramic wick to a vapor barrier wall to form a wick/vapor assembly, and bonding the wick/vapor assembly to a liquid barrier wall using a glass sealing material, a metal braze sealing material, or a solder material.

Implementations may include one or more of the following features. For example, a port may be attached to the liquid barrier wall. The port may be attached by adhering using an epoxy. The port may be attached by sealing using a solder, a glass, or a braze.

The liquid barrier wall may be formed using stereolithography. The vapor barrier wall may be formed using stereolithography.

The liquid barrier wall may be made of a ceramic material.

In another general aspect, an electrical apparatus includes a two-phase loop heat transfer system including an evaporator having an electrically insulating vapor barrier wall, and a heat-producing electrical device that is formed on the electrically insulating vapor barrier wall.

Implementations may include one or more of the following features. For example, the evaporator may include a wick. The evaporator may include a liquid barrier wall.

In another general aspect, an evaporator includes one or more materials having a thermal expansion coefficient that is within 50% of a thermal expansion coefficient of a semiconductor heat source directly coupled to the evaporator. The evaporator is configured as a part of a two-phase loop heat transfer system.

Implementations may include one or more of the following features. For example, the one or more materials may have a thermal expansion coefficient that is within about 20% of the thermal expansion coefficient of the semiconductor heat source coupled to the evaporator. The evaporator may also include a wick and a vapor barrier wall adjacent the wick and made of a material having a high thermal conductivity, such that heat is conducted at the interface between the vapor barrier wall and the wick and conduction of heat is limited beyond the interface.

The thermal conductivity of the vapor barrier wall may be high relative to the thermal conductivity of the wick.

The vapor barrier wall may be made of aluminum oxide or diamond, and the thermal conductivity of the vapor barrier wall is between about 20 W/mK to 1000 W/mK.

The evaporator may include a liquid barrier wall, and the wick may be positioned between the vapor barrier wall and the liquid barrier wall. The thermal conductivity of the vapor barrier wall may be high relative to the thermal conductivity of the liquid barrier wall.

The wick may have a porosity of between about 30% and about 70%. The wick may include pores having a radius in the range of about 1 micron to 10 microns. The wick may be made of one or more of aluminum oxide, silicon dioxide, zirconium oxide, glass, glass ceramic, chemically bonded ceramic, and a mixture thereof.

The liquid barrier wall may be made of a material having a low thermal conductivity and a thermal expansion coefficient that matches the thermal expansion coefficient of the semiconductor heat source coupled to the evaporator.

The evaporator for use in a two-phase passive loop heat transfer system is constructed out of low thermal expansion materials, thus enabling a low thermal resistance interface between the evaporator and semiconductor heat sources such as integrated circuit and power amplifier chips, laser diode bars and arrays, solid state lasers, etc., made from silicon, gallium arsenide, gallium nitride, silicon carbide, YAG, etc. Semiconductor heat sources that are cooled with such an evaporator and two-phase passive loop heat transfer system are more resistant to thermal cycling and have more reliable packaging.

The flat geometry of the vapor barrier wall of the evaporator provides a larger vaporization area, that is, the interface between the wick and the vapor barrier wall, and the working fluid is closer to the heat source than in conventional cylindrical evaporators. The flat geometry provides a lower profile evaporator than can be achieved with conventional cylindrical evaporators.

The evaporator for use in a two-phase passive loop heat transfer system has a vapor barrier wall that is thermal expansion matched to an electronic device to be cooled and is constructed out of an electrically insulating material. Such a design enables the evaporator to also serve as the insulating substrate of the electronic device, such that conductor patterns and passive and active components that need to be electrically isolated from one another can be deposited on the surface of the vapor barrier wall, which acts as a substrate, thus further increasing the compactness of the thermal packaging of the electronic device.

The evaporator is fabricated using stereolithography, and the ceramic materials developed are compatible with stereolithography. Stereolithography can be used to directly fabricate a part, to streamline the process efficiency, and enable a flexible process that is efficient for prototyping or production.

Stereolithography provides a good method of building parts having complex geometries because the parts are formed using an additive, layer-by-layer build method and a high resolution laser is used to define shape of the parts. For example, components having high aspect ratio features, internal cavities, and tortuous internal channels are easily fabricated using the layered approach of stereolithography, but such components may be difficult to fabricate using conventional techniques. The proposed ceramic evaporators have more complex geometries and are, therefore, suited to stereolithography fabrication. Additionally, the fine laser used in stereolithography enables smaller minimum feature sizes than can be achieved using conventional fabrication processes. While conventional ceramic forming processes have minimum feature size limits of about 1 mm (that is, hole diameter, post diameter, or wall thickness), the stereolithography process has a minimum feature size that is determined by the diameter of the laser beam (for example, 100 µm) and is, therefore, an order of magnitude smaller than conventional fabrication processes. Because stereolithography provides a means of making finer evaporator features such as the vapor removal channels, evaporators made using stereolithography have higher performance designs.

Other features and advantages will be apparent from the description, the drawings, and the claims.

DESCRIPTION OF DRAWINGS

Like reference symbols in the various drawings indicate like elements.

DETAILED DESCRIPTION

Figure 1:
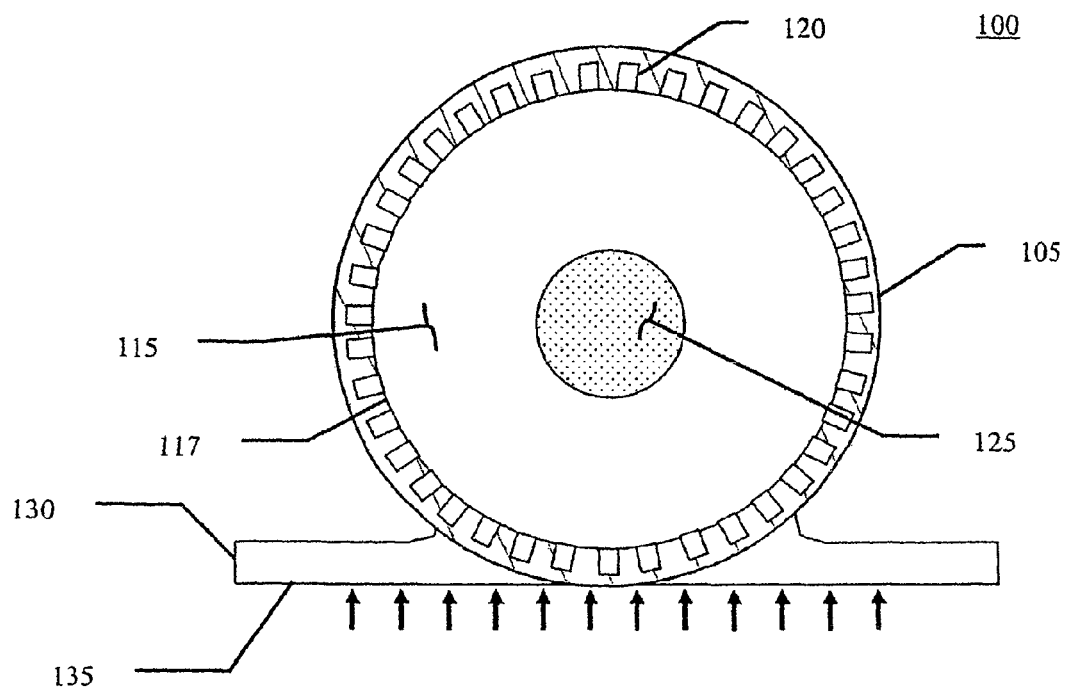
FIG. 1 is a cross-sectional view of a cylindrical evaporator.

Referring to FIG. 1, in one design, an evaporator 100 for a two-phase loop heat transfer system has a cylindrical geometry and is made of a metal such as copper and aluminum. The evaporator 100 includes a vapor barrier wall defined by an outer cylindrical housing 105, a wick 115 within the outer cylindrical housing 105, vapor removal channels 120, and a liquid flow channel 125 defined within the wick 115. The wick 115 is contained inside the outer cylindrical housing 105, such that the outer cylindrical housing 105 is in intimate contact with the wick 115 at an outer vaporization surface 117 of the wick 115. The wick 115 is made of a material capable of supporting menisci necessary to achieve capillary pumping. The working fluid flows along and through the liquid flow channel 125. The vapor removal channels 120 are located at an interface between the vaporization surface 117 of the wick 115 and the outer cylindrical housing 105.

The outer cylindrical housing 105 acts as a heat acquisition surface for a heat source and can be made from a heat-conductive material, such as, for example, sheet metal. The material chosen for the outer cylindrical housing 105 typically is able to withstand internal pressure of the working fluid.

The cylindrical geometry of the evaporator 100 is useful for containing pressure, though the evaporator's geometry is inconsistent with the geometry of non-cylindrical heat sources that it may be used to cool. Therefore, the evaporator 100 includes a saddle 130 having a flat surface 135 that is normally attached to the outer cylindrical housing 105, such that the saddle 130 acts as a heat acquisition surface for a heat source having a flat surface. In this case, the saddle 130 can be mounted with the flat surface of the heat source that requires the transfer of heat (such as, for example, a computer processor chip or a lasing medium). The addition of the saddle 130 increases the resistance to heat transfer between the surface of the heat source that transfers the heat and the working fluid within the evaporator 100, thus potentially increasing the temperature difference between the evaporator 100 and the heat source surface. The saddle 130 also adds additional thickness and weight to the evaporator 100, which may impact the ability of the evaporator 100 within lightweight two-phase loop heat transfer systems designed for integration with minimal clearance. Also, the perimeter of the saddle 130 is farther away from vaporization surface 117 and, thus, the thermal resistance may not be uniform across the area of the saddle 130. One or more of these and other attributes and characteristics can affect the ability of an evaporator 100 to assist in achieving temperature uniformity (for example, less than 1° C.) over relatively large areas (for example, several square centimeters). Moreover, in order to cover a large area heat source more uniformly, the diameter of the cylindrical evaporator 100 should be increased. Such an increase in diameter can have an adverse effect of increasing the overall profile of the evaporator 100, which could limit the use of such an evaporator 100 in two-phase loop heat transfer systems for cooling densely packed electronics where space is limited.

Previously, semiconductor devices such as integrated circuit and power amplifier chips, laser diode bars and arrays, solid state lasers, and those devices made from silicon, gallium arsenide, gallium nitride, silicon carbide, and YAG, for example, were cooled in an indirect manner using a two-phase passive loop heat transfer system in which the evaporator saddle 130 is bolted or otherwise attached to a metal baseplate or box that houses the semiconductor device. Such indirect cooling may result in a relatively large temperature differential between the heat source and the working fluid of the two-phase passive loop heat transfer system, and may require a relatively bulky packaging.

Alternatively, a semiconductor device could be cooled with a heat sink that is embedded in or directly attached to the semiconductor device. For example, a semiconductor device could be cooled with an embedded heat pipe. In these devices, the thermal resistance between the heat source and the heat sink is very low and the device is very compact; however, these devices merely spread the heat a short distance through the semiconductor device and are, therefore, considered heat spreaders. Such heat spreaders are severely limited to very low heat flux capacity.

In another example, the semiconductor device could be cooled with a liquid cooled heat exchanger (such as a cold plate) in which the coolant flows through the heat exchanger by means of a mechanical pump. Some of the cold plates use metal composites such as tungsten copper or aluminum silicon carbide and others use silicon in order to provide a close thermal expansion match to the semiconductor heat source. However, the cold plates do not utilize a phase change of the cooling fluid and thus require a high temperature differential between the heat source and the heat sink.

A two-phase passive loop heat transfer system can handle high heat flux and can transfer heat a large distance with a very low temperature differential between the heat source and the heat sink. A two-phase passive loop heat transfer system also does not require the use of a mechanical pump. However, materials typically used in two-phase passive loop heat transfer systems were not thermally matched to the heat sources to which they were attached to cool. In fact, two-phase passive loop heat transfer systems have conventionally been made with common metals or metal alloys, rather than ceramics. By way of example, in manufacturing two-phase passive loop heat transfer systems, materials are selected that are simple to machine and process, are predictably able to contain the amount of pressure produced internally by the two-phase heat transfer, and are thermally conductive. Thus, evaporators used in two-phase passive loop heat transfer systems are typically made of common metals or metal alloys such as copper, aluminum, or stainless steel, and cannot be directly bonded to most semiconductor or optical heat sources because of the large difference in thermal expansion coefficient between the metal evaporator and common semiconductor electronic materials such as, for example, silicon, gallium arsenide, silicon carbide, gallium nitride, and yttrium aluminum garnet. As shown below, Table 1 lists the thermal expansion coefficients for different electronics materials, the metals that are commonly used to make evaporators, and some lower expansion materials that could be used to make evaporators.

TABLE 1

| | Material (Use) | Thermal Conductivity (W/mK) | Expansion Coefficient (ppm/K) |
|---|---|---|---|
| Semiconductor Heat Sources | Silicon (processor chips) | 150 | 4-5 |
| | GaAs (laser diode bars, power amplifiers) | 46 | 5-6 |
| | 4H-SiC (power electronics) | 370 | 4-5 |
| | GaN (LEDs, power electronics) | 130 | 3-5.5 |
| Conventional Evaporator Materials | Stainless Steel (wick & body) | 20 | 18 |
| | Titanium (wick) | 10 | 8 |
| | Nickel (wick) | 25 | 20 |
| | Aluminum (body) | 170 | 23 |
| | Copper (body) | 400 | 19 |
| Candidate Low CTE Evaporator Materials | CuW: 10-20% Cu | 180-200 | 65.-8.3 |
| | KOVAR ® | 17 | 5.2 |
| | Al/30-60% SiC | 150-180 | 7-10 |
| | Pyrolitic graphite-encapsulated | 10 in Z-dir 1700 in X/Y | 7-22 (encapsulant) |
| | Glass Ceramic | 2 | 5-8 |
| | Aluminum oxide | 25 | 7-8 |
| | Aluminum nitride | 180 | 4-5 |
| | Beryllium oxide | 280 | 8-9 |
| | Silicon carbide | 300 | 3-4 |

When a large difference exists between the expansion coefficients of the semiconductor heat source and the evaporator, a compliant thermal interface material may be used. However, compliant thermal interface materials have a much lower conductance than more rigid interface materials, such that when they are used, a degradation in thermal performance of the heat transfer system results. Examples of thermal interface materials and their respective conductances include: a compliant silicone-based thermal gasket or interface insert having a thickness of 100 μm to 500 μm and a conductance of 0.15 W/° C.-cm$^2$ to 0.3 W/° C.-cm$^2$; a compliant carbon particle-based thermal gasket or interface insert (made from Grafoil, for example,) having a thickness of 250 μm and a conductance of 0.6 W/° C.-cm$^2$ to 1.0 W/° C.-cm$^2$; a semi-rigid adhesive bond having a bond line thickness of 100 μm to 250 μm and a conductance of 0.5 W/° C.-cm$^2$ to 0.9 W/° C.-cm$^2$; a semi-rigid adhesive bond having a bond line thickness of 25 μm to 75 μm and a conductance of 0.9 W/° C.-cm$^2$ to 1.1 W/° C.-cm$^2$; and a rigid solder or braze having a thickness of 75 μm to 125 μm and a conductance of 50 W/° C.-cm$^2$ to 200 W/° C.-cm$^0$.

In some applications, the evaporator can be integrated into the packaging of the heat source, such that the semiconductor device heat source is bonded directly to the evaporator during manufacture of the semiconductor device. Integration may require that the evaporator material to which the heat source is bonded be electrically insulating. It would also be useful to be able to deposit circuit patterns to deliver electrical power and signals to and from the semiconductor device that is being cooled by the evaporator and the heat transfer system. In such cases, the metals that are typically used to make evaporators would not be acceptable as such metals may interfere with the circuit provided on the semiconductor device.

Typically, semiconductor devices include an active media or die that is formed on and bonded to a substrate. The substrate may be insulating or conductive with an insulating barrier between the substrate and the die. A typical insulating substrate is a ceramic board. In this case, the evaporator vapor barrier wall can be made out of a ceramic material (such as those ceramics that are commonly used for microelectronic substrates, including alumina, aluminum nitride, and beryllium oxide). The conductor patterns, the surface mount passive device, or the semiconductor devices that make up the microelectronic circuit can be formed directly on the vapor barrier wall. After the microelectronic circuit is formed, the evaporator can be connected to the rest of the two-phase passive loop heat transfer system and the microelectronic circuit can be connected to the rest of the electronic system.

Figure 2:
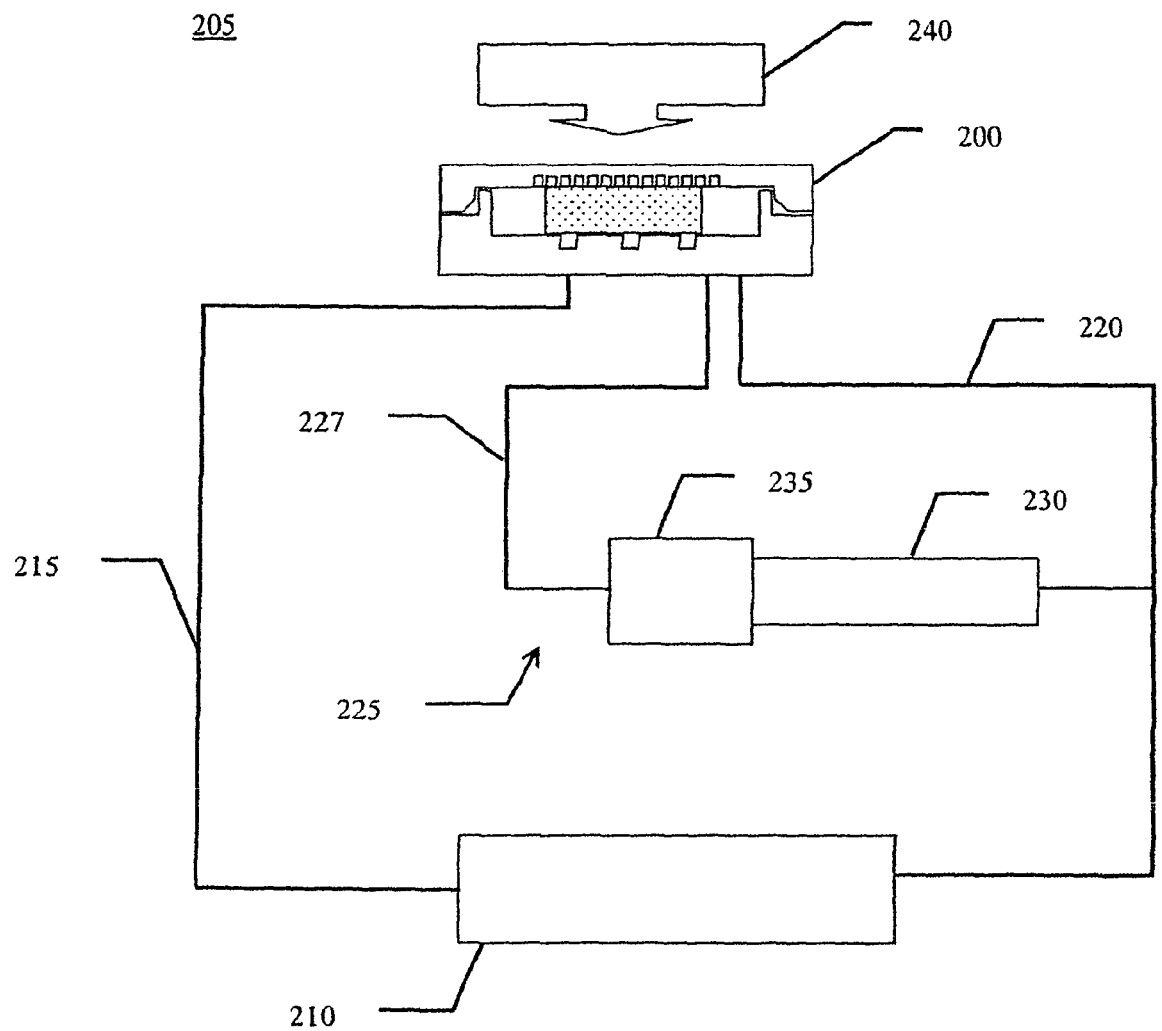
FIG. 2 is a schematic diagram of a two-phase passive loop heat transfer system.

Referring to FIG. 2, an evaporator 200 is the heat acquisition component in a two-phase loop heat transfer system 205 that also includes a condenser 210 coupled to the evaporator 200 by a liquid line 215 and a vapor line 220, and a priming system 225 coupled to the evaporator 200 through a sweepage line 227. The priming system 225 includes a secondary evaporator 230 and a reservoir 235 thermally and hydraulically coupled to a core of the secondary evaporator 230. In use, the evaporator 200 is thermally coupled to a heat source 240, the condenser 210 is thermally coupled to a heat sink, and fluid flows between the evaporator 200 and the condenser 210. As shown, the evaporator 200 is in a hybrid loop heat pipe system that includes the priming system 225, which is used to ensure liquid is present in the wick of the evaporator 200 at start up and to provide excess liquid flow to the evaporator 200, such that any vapor bubbles that form on the liquid side of the evaporator 200 are removed from the evaporator 200. The fluid within the heat transfer system 205 can be referred to as the working fluid. As used in this description, the term "fluid" is a generic term that refers to a liquid, a vapor, or a mixture of a liquid and a vapor.

The evaporator 200 is made from a material that has a thermal expansion coefficient that matches the electronic device to be cooled (for example, common semiconductor electronic devices). For example, in one implementation, the evaporator 200 is a ceramic evaporator that has a thermal expansion coefficient that matches semiconductor heat sources and enables the use of a low thermal resistance interface between the semiconductor heat source and the working fluid.

In one implementation, the evaporator 200 is made with a flat heat-receiving surface and thus has a flat barrier design that provides a much lower profile evaporator compared to conventional cylindrical evaporators. In fact, as shown, the evaporator 200 has a generally flat geometry and is, therefore, used for cooling electronic devices having flat interfaces (for example, semiconductor devices and optical devices).

The evaporator 200 can be used within the two-phase loop heat transfer system 205 to cool electronic, electro-optical, and optical devices such as, for example, semiconductor chips, lasers, and other heat sources made of low thermal expansion material, and having a flat heat transferring surface.

Referring also to FIGS. 3 through 6, the evaporator 200 includes a vapor barrier wall 305, a liquid barrier wall 310, and a wick 315 contained between an inner side 320 of the vapor barrier wall 305 and an inner side 325 of the liquid barrier wall 310, such that the wick 315 is in intimate contact with the walls 305, 310. The vapor barrier wall 305, liquid barrier wall 310, and wick 315 are assembled with the liquid barrier wall 310 and the vapor barrier wall 305 encompassing the wick 315 and forming a hermetic body.

The evaporator 200 includes vapor removal channels 330, and a liquid flow channel 335. The liquid barrier wall 310 contains working fluid on an inner side 325 of the liquid barrier wall 310, such that the working fluid flows only along the inner side 325 of the liquid barrier wall 310 and through the liquid flow channel 335. The liquid barrier wall 310 closes the evaporator's envelope and helps to organize and distribute the working fluid through the liquid flow channel 335. The vapor removal channels 330 are located at an interface between a vaporization surface 317 of the wick 315 and the vapor barrier wall 305.

The vapor barrier wall 305 includes an exterior heat acquisition surface 340 for receiving a heat source. The material chosen for the vapor barrier wall 305 typically is able to withstand internal pressure of the working fluid. The vapor barrier wall 305 shown in FIGS. 2 through 6 is flat and has a thickness of about 0.020 of an inch. The vapor barrier wall 305 may be formed of material with a high thermal conductivity and a thermal expansion coefficient similar to the thermal expansion coefficient of the heat source that is being cooled. For example, if the heat source to be cooled is a semiconductor, electro-optic, or optical device, then the vapor barrier wall 305 may be made of ceramic materials such as, for example, aluminum oxide, silicon nitride, aluminum nitride, silicon carbide, beryllium oxide, diamond, and composites of these materials. Or, the vapor barrier wall 305 may be made of metal materials such as, for example, molybdenum, low expansion nickel alloys, tungsten/copper composites, molybdenum/copper composites, beryllium/beryllium oxide composites, and aluminum/silicon carbide composites.

Figure 3:
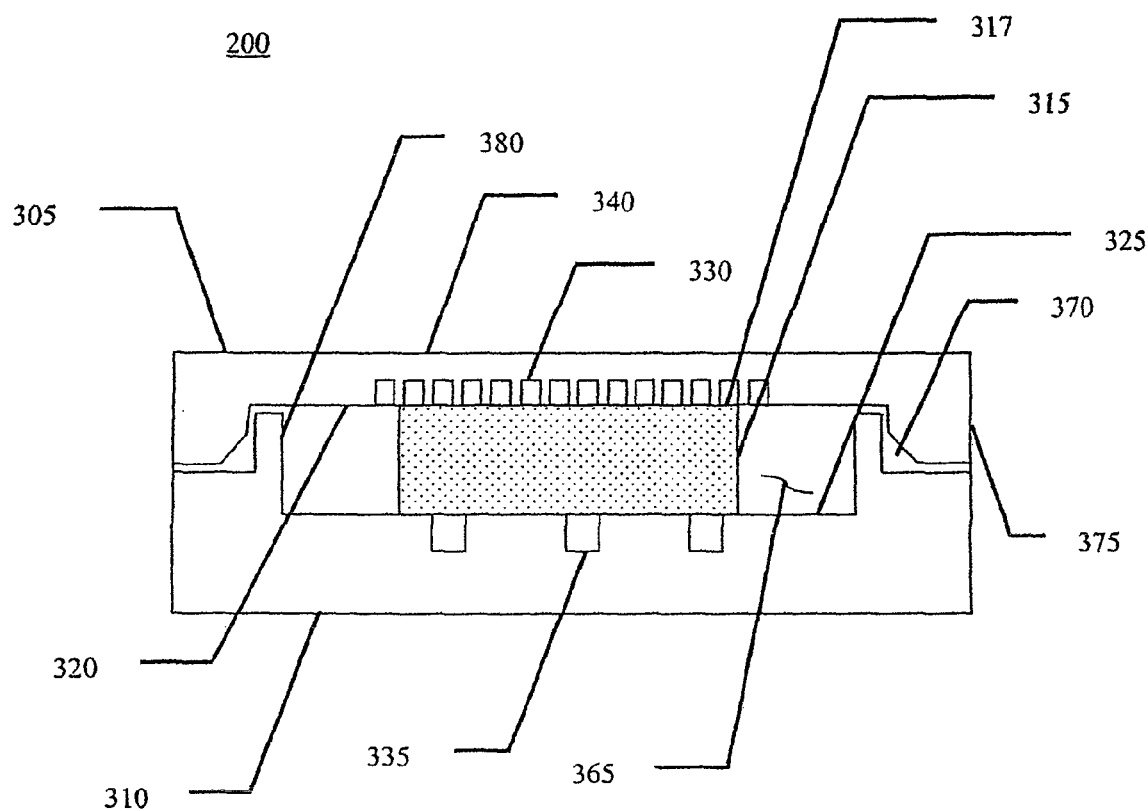
FIG. 3 is a cross-sectional view of an evaporator used in the two-phase passive loop heat transfer system of FIG. 2.
Figure 4:
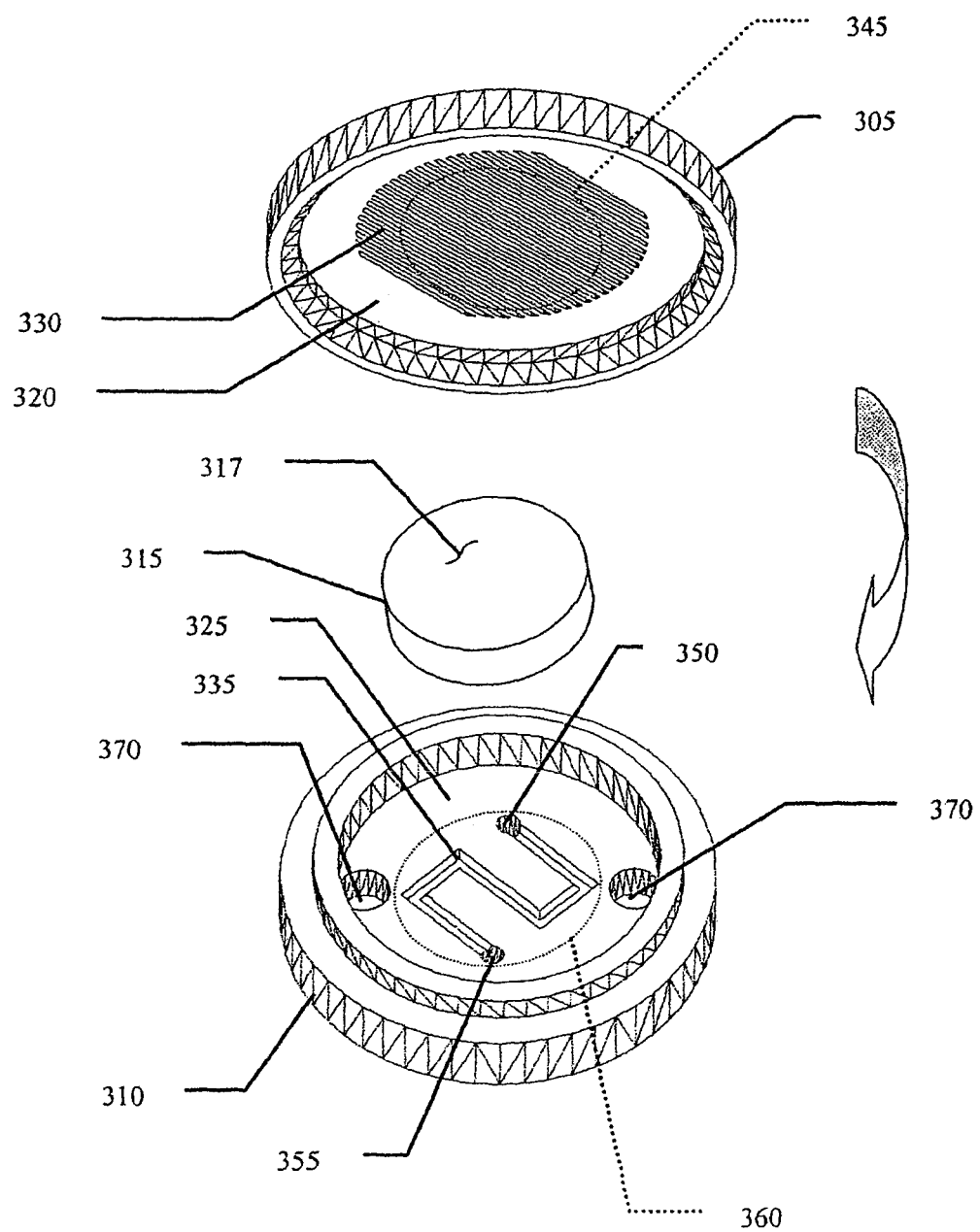
FIG. 4 is an exploded perspective view of the evaporator of FIG. 3.
Figure 12:
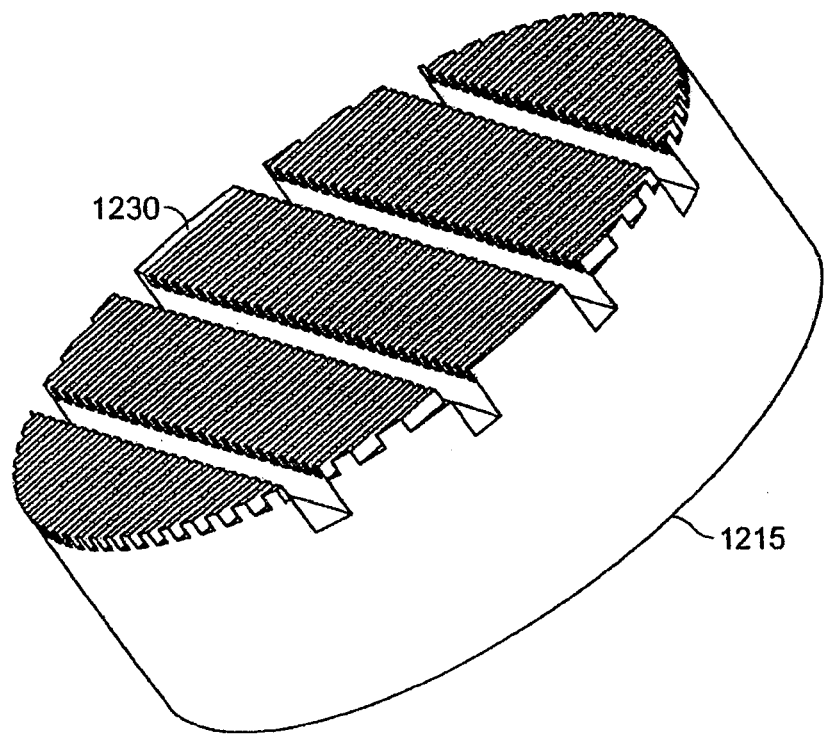
FIG. 12 is a perspective view of a wick that can be used in the evaporator of FIG. 3.

The inner side 320 of the vapor barrier wall 305 is in contact with the wick 315. Vapor that is generated from evaporation of the working fluid at the interface (e.g., vaporation surface 317) flows through the vapor removal channels 330. The channels 330 can be formed in the wick 315 (as shown in FIG. 12), in the vapor barrier wall 305 (as shown in FIG. 3), or in both the wick 315 and the vapor barrier wall 305. If formed in the wick 315, the channels 330 may extend the full width through the perimeter of the wick 315. If formed in the vapor barrier wall 305, the channels 330 may extend beyond the perimeter of the wick 315. For example, as shown in FIG. 4, the perimeter 345 of the wick 315 is represented by a dotted line superimposed over the vapor barrier wall 305 to show the size of the wick 315 relative to the vapor removal channels 330. The vapor removal channels 330 can have any suitable cross-sectional shape, such as, for example, a polygonal shape such as a square as shown in FIG. 3, a trapezoidal shape, or a rounded shape such as a semicircle or a semi-oval. In one implementation, the dimensions of the vapor removal channels 330 are 300 µm wide×300 µm deep, and the walls that divide the channels 330 are 300 µm wide.

The wick 315 is sandwiched between the vapor barrier wall 305 and the liquid barrier wall 310. The wick 315 may be bonded to either or both the liquid barrier wall 310 and the vapor barrier wall 305 to add strength to the evaporator for pressure containment. In one implementation, the wick 315 is uniformly in contact with both barrier walls 305, 310, such that no gaps (other than the designed vapor removal channels 330 and the liquid flow channel 335) larger than the pore size in the wick 315 are present at the interfaces with the walls 305, 310.

Figure 5:
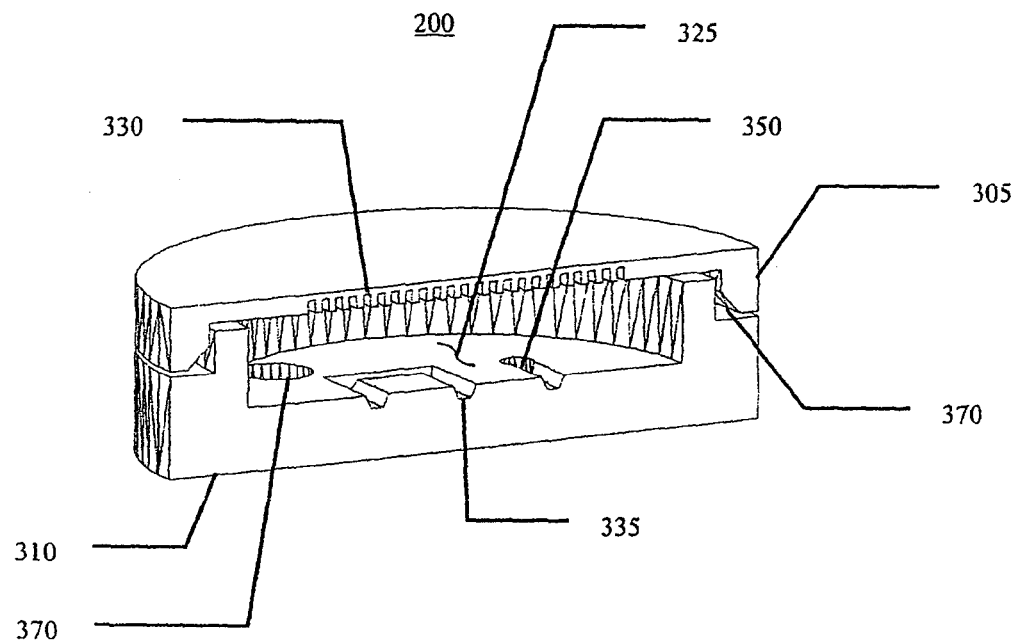
FIG. 5 is a cross-sectional perspective view showing an outer surface of a vapor barrier wall of the evaporator of FIG. 3.
Figure 6:
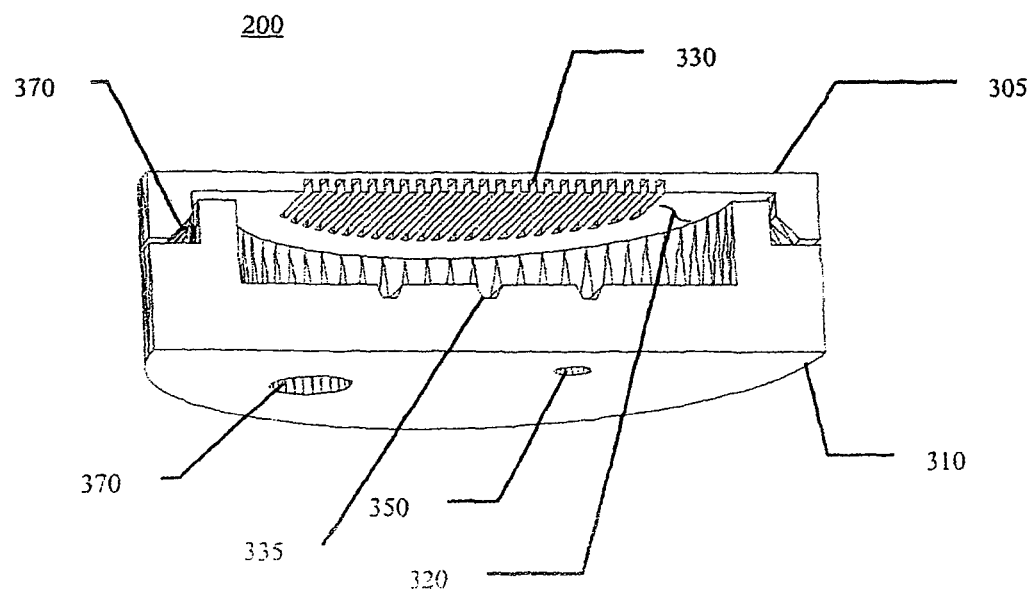
FIG. 6 is a cross-sectional perspective view showing an outer surface of a liquid barrier wall of the evaporator of FIG. 3.

The liquid flow channel 335 is a liquid distribution channel that is situated at the interface between the wick 315 and the liquid barrier wall 310. The working fluid flows into the liquid flow channel 335 from the liquid line 215 (FIG. 2) and into the wick 315 through the liquid flow channel 335. As shown, the liquid flow channel 335 generally has an S-shape as it winds across the interface between the wick 315 and the liquid barrier wall 310. The liquid flow channel 335 can be formed in the liquid barrier wall 310 (as shown in FIG. 3), in the wick 315, or in both the liquid barrier wall 310 and the wick 315. The liquid flow channel 335 can have any suitable cross-sectional shape, such as, for example, a polygonal shape such as a square as shown in FIG. 3, a trapezoidal shape with the narrow face on the side adjacent the liquid barrier wall 310 and the wide face adjacent the wick 315 as shown in FIGS. 5 and 6, or a rounded shape such as a semicircle or a semi-oval. In one implementation, the cross-sectional dimension of the liquid flow channel 335 is 1 mm×0.5 mm×0.5 mm.

As shown in FIG. 4, the liquid flow channel 335 traverses the wick 315 from a first liquid port 350 that extends through the liquid barrier wall 310 to a second liquid port 355 that extends through the liquid barrier wall 310. The first liquid port 350 couples to the liquid return line 215 (FIG. 2) and the second liquid port 355 couples to the sweepage line 227 (FIG. 2). The length of the liquid flow channel 335 from the first liquid port 350 to the second liquid port 355 is large enough to distribute the liquid over the surface of the wick 315. The liquid flow channel 335 remains bound within the perimeter of the wick 315. For example, as shown in FIG. 4, the perimeter 360 of the wick 315 is represented by a dotted line superimposed over the liquid barrier wall 310 to show the size of the wick 315 relative to the liquid flow channel 335.

The wick 315 is made of a low thermal conductivity material with a high level of open porosity, for example, at least 30% porosity or 60% or higher porosity. The radius of the pores in the wick 315 are in the range of about 1 µm to 20 µm. The wick 315 can be made of a material having these properties, such as, for example, aluminum oxide, silicon dioxide, zirconium oxide, mullite, chemically bonded ceramics such as cermet materials, glass, or glass ceramic, or mixtures thereof. The wick 315 can be made of a metal material having these properties, such as, for example, titanium or nickel. In another implementation, the wick 315 can be made from short fiber material or from particulate materials that are pressed to the desired density and sintered to impart strength to the wick.

The liquid barrier wall 310 defines a cavity 365 that has a larger diameter than the diameter or size of the wick 315. The liquid barrier wall 310 includes the liquid ports 350, 355 and at least one vapor outlet port 370 that couples to the vapor line 220 (FIG. 2). As shown, the vapor outlet port 370 is situated in the base of the liquid barrier wall 310. The vapor outlet port 370 can be located in any location, as long as it opens into the space between the wick 315 and the cavity walls of the liquid barrier wall 310, such that vapor from the vapor removal channels 330 can reach the vapor outlet port 370.

The liquid barrier wall 310 can be made of a low thermal conductivity material with a low thermal expansion coefficient that is similar to that of the vapor barrier wall 305 and the wick 315. For example, to the extent that a vapor barrier wall 305 is made of a low thermal conductivity material with a low thermal expansion coefficient, the liquid barrier wall 310 can be made of a ceramic material such as, for example, aluminum oxide, silicon dioxide, zirconium oxide, mullite, chemically bonded ceramics such as cement, glass, or glass ceramics. As another example, to the extent that a different material that more similarly demonstrates the thermal expansion coefficient of a metal material, the liquid barrier wall 310 can be made of a metal material such as, for example, low expansion alloys and titanium. In any case, the material chosen for the liquid barrier wall 310 is typically able to withstand internal pressure of the working fluid.

Figure 7:
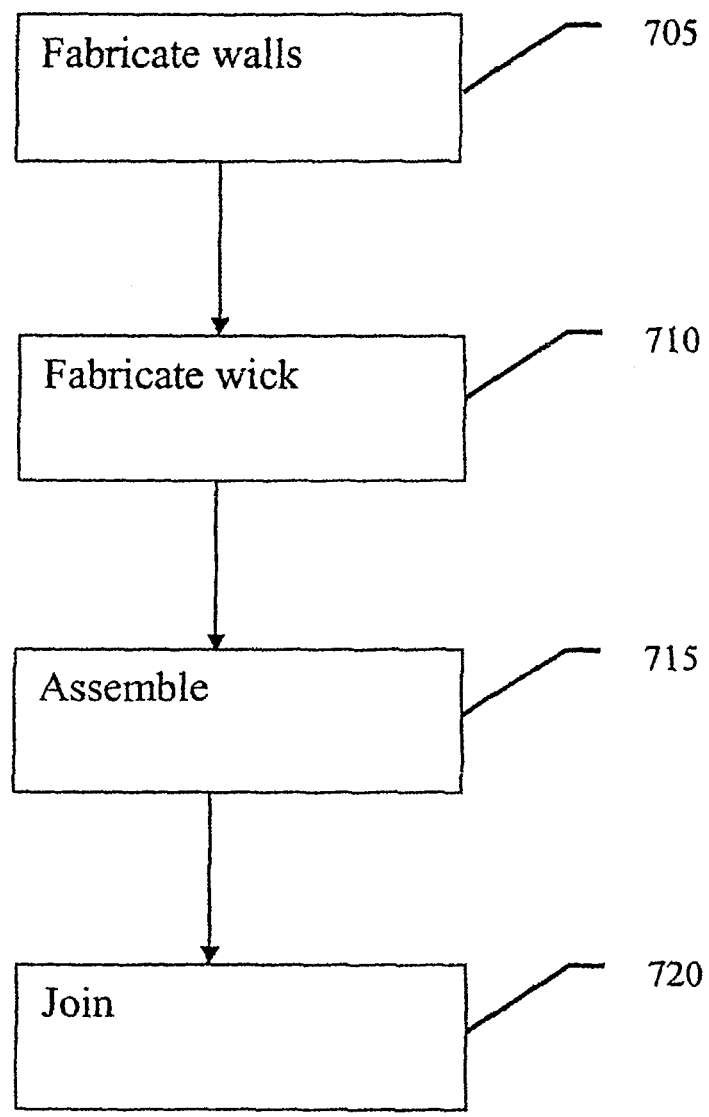
FIG. 7 is a flow chart of a procedure for fabricating the evaporator of FIG. 3.

Referring to FIG. 7, the evaporator 200 is fabricated according to a procedure 700. Initially, the liquid barrier wall 310 and the vapor barrier wall 305 are fabricated (step 705). Next, the wick 315 is fabricated (step 710). Lastly, the liquid barrier wall 310, the vapor barrier wall 305, and the wick 315 are assembled (step 715), and joined together to form a hermetic seal (step 720). In particular, the vapor barrier wall 305 is bonded and hermetically sealed to the top face of the liquid barrier wall 310.

Figure 8:
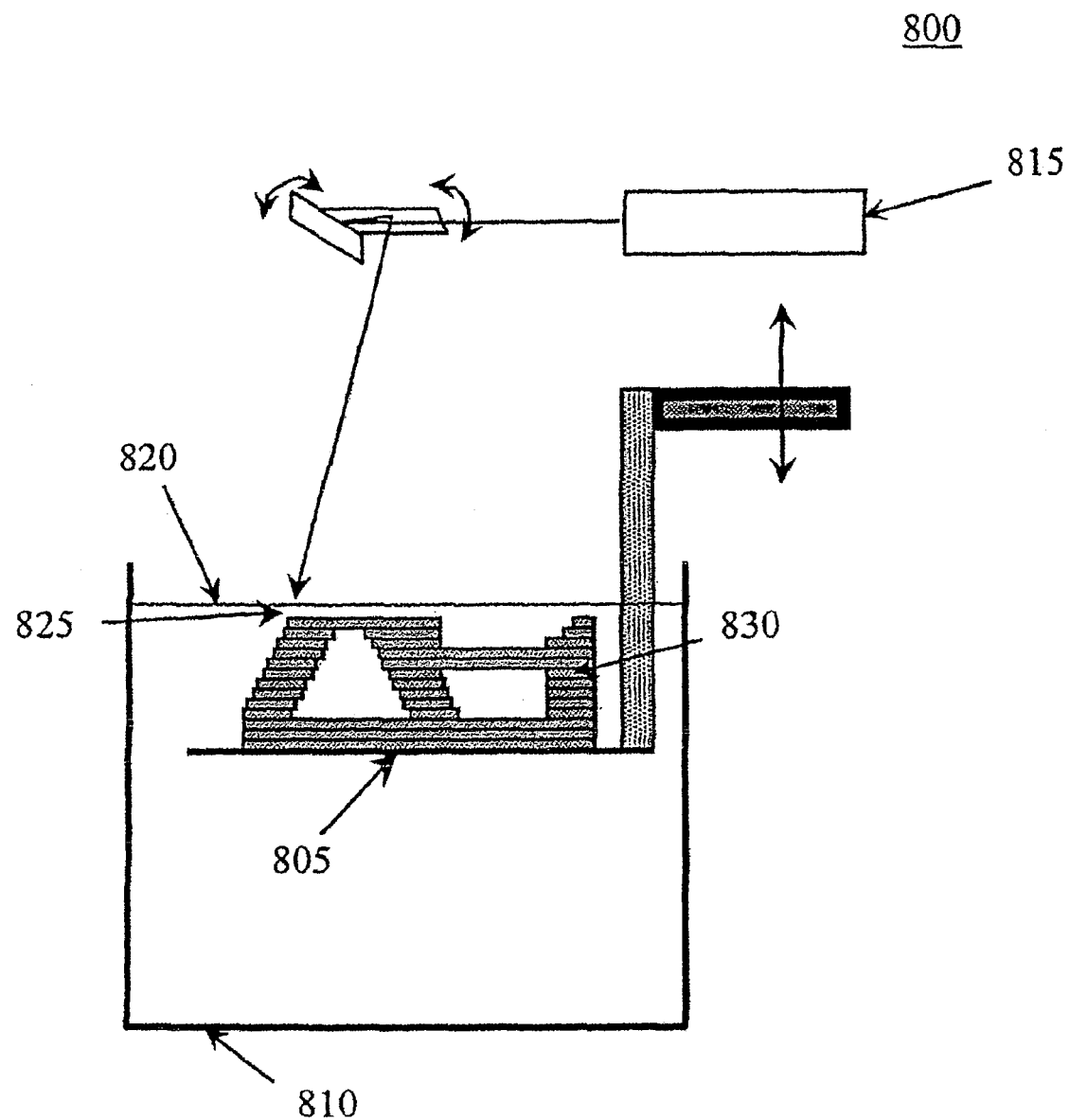
FIG. 8 is a schematic of a stereolithography process for making the evaporator of FIG. 3 using the procedure of FIG. 7.

Referring also to FIG. 8, the liquid barrier wall 310 or the vapor barrier wall 305 can be fabricated (step 705) directly from a CAD file using a stereolithography machine 800 (for example, SLA® 250/40, 3D Systems, Inc., Valencia, Calif.). The stereolithography process builds using an automated layered fabrication approach.

The stereolithography machine 800 produces parts that are "green" state ceramics and fired to achieve the strength, hardness, and other pertinent properties of a high-performance ceramic. The firing process is performed in air at a temperature of around 1600° C. During sintering, the parts in the machine 800 experience about a 15% linear shrinkage. The amount of shrinkage is repeatable and the CAD file is scaled to compensate prior to stereolithography fabrication.

The stereolithography process is a rapid prototyping (automated freeform fabrication) process for forming plastic, three-dimensional (3D) prototypes automatically from a CAD file. In stereolithography, parts are built on a build platform 805 situated in a vat or reservoir 810 of liquid photocurable resin. A UV-laser 815 is scanned on a surface 820 of the resin to selectively solidify the liquid resin using a photo-initiated cross-linking reaction to form a built layer 825. A three-dimensional part can be built layer-by-layer as the laser 815 solidifies each layer and bonds the new layer to the previously solidified layer.

The stereolithography process is adapted to fabricating high-performance, net-shape ceramic components by replacing a conventional epoxy-based resin in the vat 810 with a ceramic-based resin. The ceramic-based resin includes a fine, sinterable ceramic powder dispersed in a liquid photocurable resin. The mixture is used in the stereolithography machine to build a "green-state" ceramic part 830 to the desired shape. The ceramic parts are then subjected to conventional debinding and firing steps to burnout the photocurable resin that serves as a binder for the ceramic particles, and sinter the ceramic to high density. During sintering, the body shrinks in a predictable manner based on the difference between the green density and its final sintered density. In conventional powder processing of high-performance ceramics, sintering shrinkages commonly fall in the range of about 12% to 22% linear. For example, an alumina stereolithography resin gives a green density of 55% of theoretical density, a sintered density >98% of the theoretical density, and a linear shrinkage of 16.5% (X, Y and Z directions equal).

If the vapor barrier wall 305 has a flat plate geometry, then it can be made by conventional methods of making flat sheets or plates in the material of choice.

The wick is fabricated (step 710) using the following approach, which produces wicks having good performance (that is, about 40% to 60% porosity for a 1.8 μm to 4 μm average pore radius). The approach was tested and these properties (porosity and pore radius) were repeatable with standard deviation similar to the commercially available sintered metal wicks. The starting material for the wick fabrication is an alumina paper (high-temperature insulation) material that is about 1 mm thick and made of 3% short alumina fiber and 97% air. The mean fiber diameter is about 3.0 μm to 0.5 μm. This alumina paper material is cut to the desired shape of the wick, stacked, and compacted in a uniaxial press at pressure ranging from about 5,000 to about 20,000 psi. The compaction increases the density to the range of about 30% to 60% of theoretical density. The stack is then sintered in a high-temperature air furnace at about 1600° C., during which the stack shrinks and becomes rigid and strong. The diameter shrinkage is about 5% and the thickness shrinkage is about 10%. If a wick having a greater porosity is desired, then high-temperature rigid board insulation can be utilized instead of alumina paper material. A product from Zircar Ceramics Inc., has about 70% porosity and an effective pore radius of about 20 μm.

The liquid barrier wall 310, the vapor barrier wall 305, and the wick 315 are assembled (step 715) by first high-temperature bonding the wick 315 to the micro-channeled region of the vapor barrier wall 305 to form a wick/vapor barrier wall assembly. Then, the wick/vapor barrier wall assembly is bonded to the liquid barrier wall 310 using a glass sealing material formed between the wick 315 and the liquid barrier wall 310 (step 720). Additionally, the glass sealing material is placed within a port 370 defined between a rim 375 of the vapor barrier wall 305 and a rim 380 of the liquid barrier wall 310 (step 720) to obtain a hermetic perimeter seal between the rims 375, 380. Glass sealant materials are available in a variety of forms including, for example, powder, paste, green tape, and sintered preforms. In one implementation, the powder is purchased and then mixed with a photocurable resin vehicle to form a flowable paste, which is applied to the desired regions of the evaporator 200 using a syringe and then cured under an ultraviolet light for several seconds. The evaporator 200 is then fired in an oven to a temperature of about 1000° C. to achieve a hermetic seal and complete the bonding (step 720). Alternatively, a metal solder or a braze material could be used to seal the vapor barrier wall and the liquid barrier wall.

After bonding (step 720), metal fittings are attached to the ports 350, 355, 370 of the liquid barrier wall 310 using, for example, epoxy adhesive, metal solder, metal braze, or any suitable attachment in which the hermetic seal is maintained.

Other implementations are within the scope of the following claims.

Figure 9:
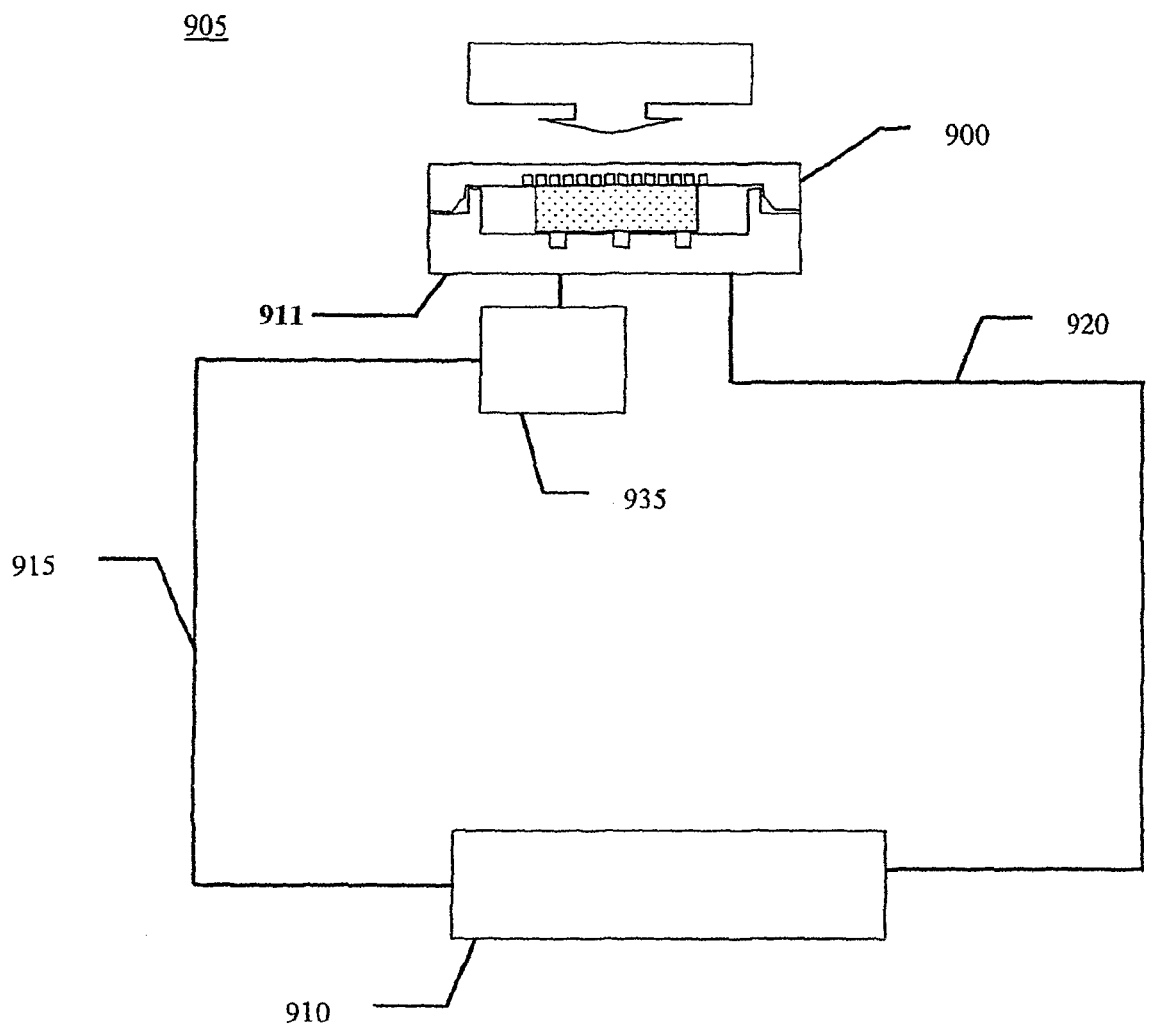
FIGS. 9 and 10 are schematic diagrams of other two-phase passive loop heat transfer systems such as illustrated by FIG. 2.
Figure 10:
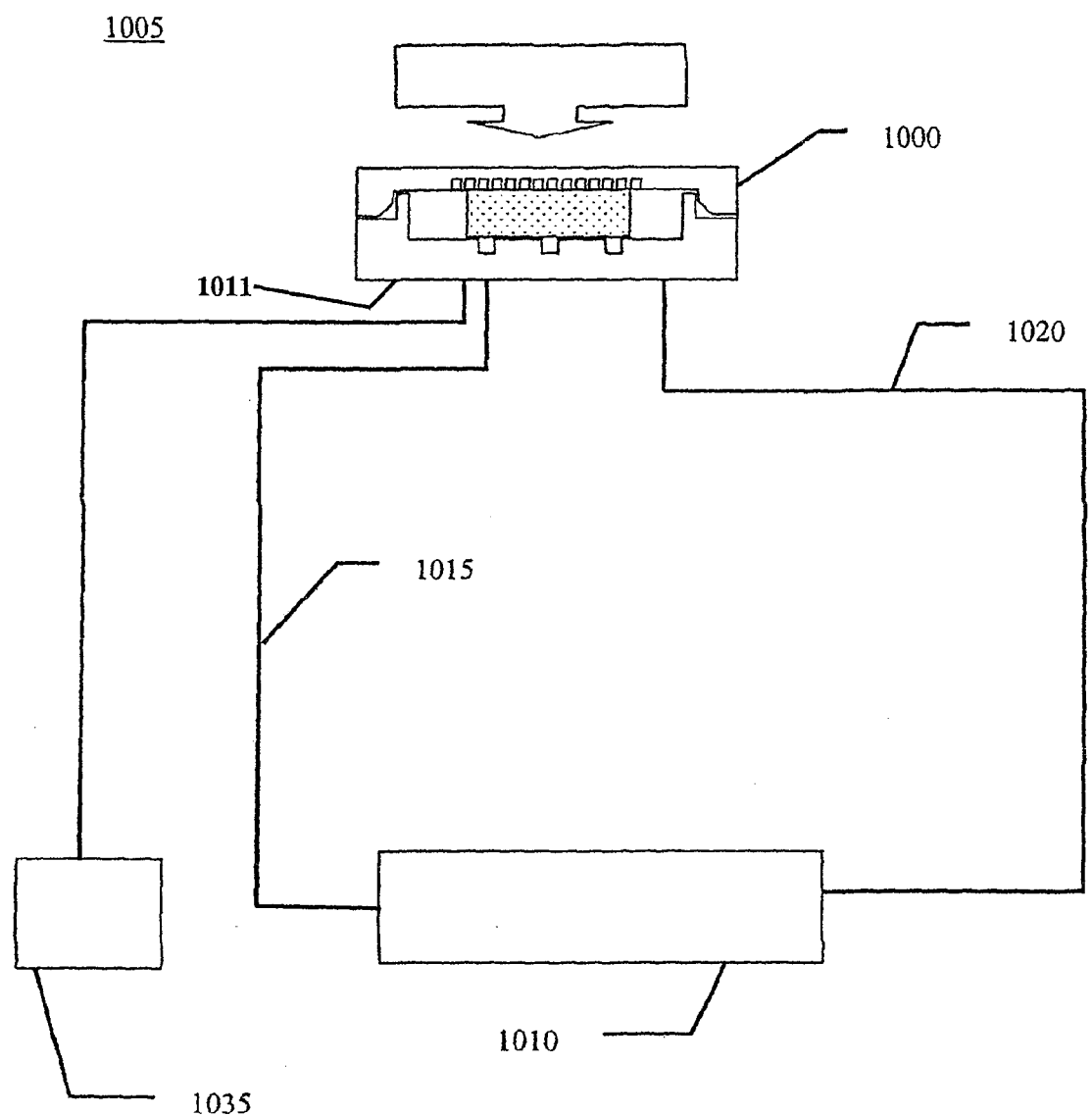
Figure 11:
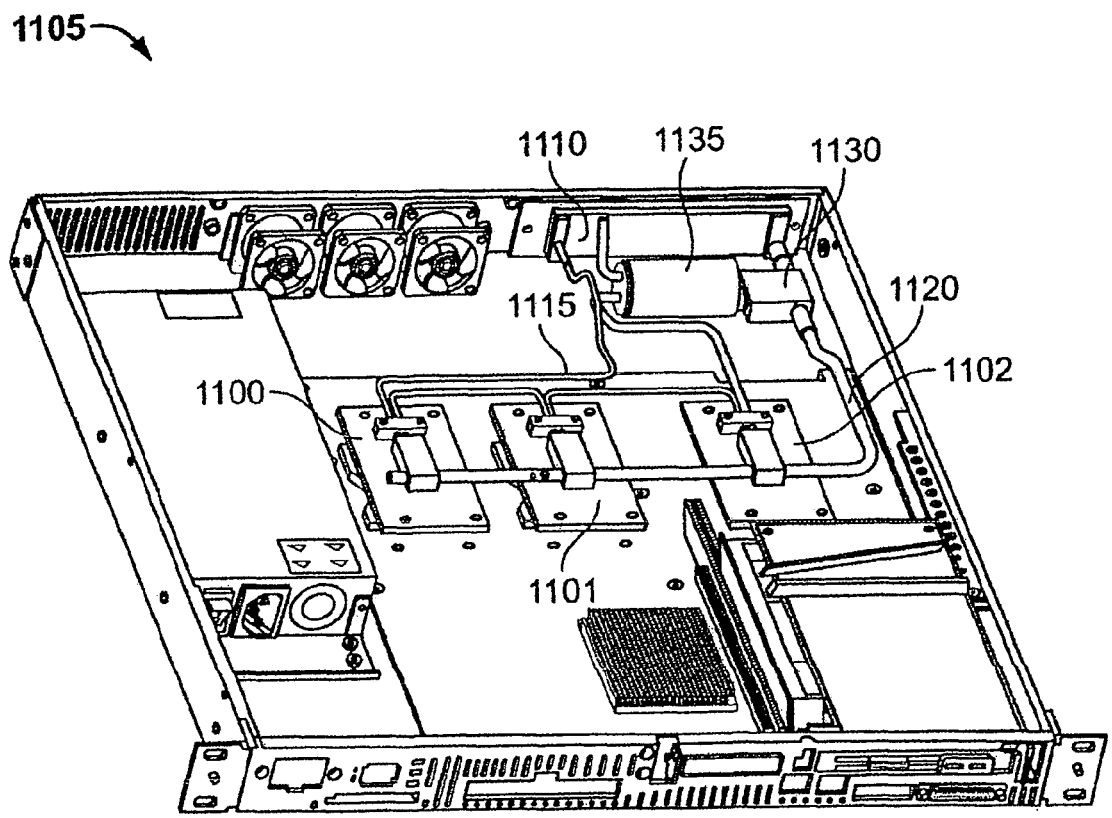
FIG. 11 is a perspective view of a two-phase passive loop heat transfer system.

The evaporator described above may be used in any two-phase loop heat transfer system, including, respectively, a CPL, an LHP, a hybrid LHP, or a multiple-evaporator hybrid LHP. For example, as shown in FIG. 9, an evaporator 900 is used in an LHP 905. In the evaporator 900, a liquid barrier wall 911 need only include one liquid port that couples to a liquid return line 915 through a reservoir 935. The LHP 905 includes a condenser 910 coupled to the evaporator 900 by the liquid return line 915 and a vapor line 920. As another example, as shown in FIG. 10, an evaporator 1000 is used in a CPL 1005. In the evaporator 1000, a liquid barrier wall 1011 may include one port that couples both to a reservoir 1035 and to a liquid return line 1015. The LHP 1005 also includes a condenser 1010 coupled to the evaporator 1000 by the liquid return line 1015 and a vapor line 1020. As a further example, as shown in FIG. 11, an evaporator 1100 is used in a hybrid LHP 1105 having additional multiple evaporators 1101, 1102. A hybrid LHP 1105 includes a condenser 1110 coupled to the first evaporator 1100 by a liquid return line 1115 and to the third evaporator 1102 by a vapor line 1120. The hybrid LHP 1105 includes a secondary evaporator 1130 and a reservoir 1135 thermally and hydraulically coupled to a core of the secondary evaporator 1130.

Referring to FIG. 12, and as mentioned above, in another implementation, vapor removal channels 1230 may be formed on a wick 1215. The vapor removal channels 1230 or

230 (FIG. 2) may include two sets of grooves, the first set being a set of fine grooves and the second set being a set of coarser grooves that are oriented perpendicularly to the first set of fine grooves. The fine grooves can be adjacent to or built into the interior surface of the vapor barrier wall. The two groove sets are in contact with each other, such that vapor can flow from the fine grooves into the coarse grooves. The wick material uniformly contacts the vapor barrier wall, such that no gaps (other than the vapor removal channels) larger than the pore size in the wick are present at this interface. The thickness of the vapor barrier wall is thin enough to minimize temperature differential from the heat source to the working fluid, and thick enough to provide sufficient strength for pressure containment, typically in the range of 0.25 mm to 1 mm thick.

Figure 13:
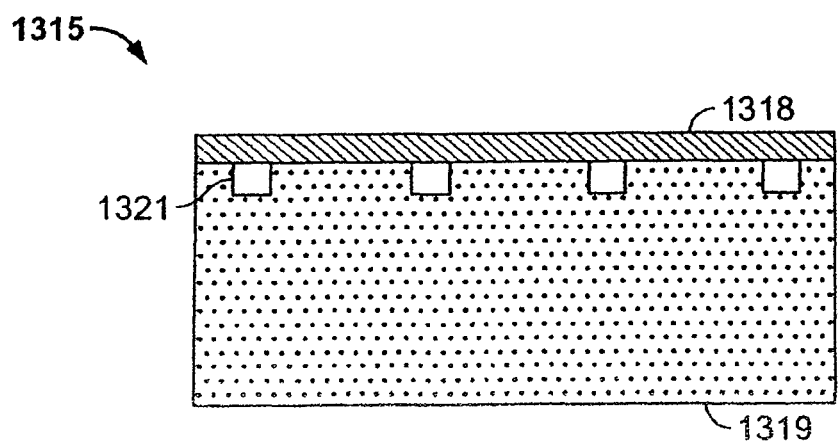
FIG. 13 is a cross-sectional view of a wick that can be used in the evaporator of FIG. 3.

Referring to FIG. 13, in another implementation, a wick 1315 can be made of two separate pieces, a vaporization piece 1318 and a supply piece 1319. The vaporization piece 1318 can be made of a high thermal conductivity material and is bonded to the vapor barrier wall with a high thermal conductivity joint material. The vaporization piece 1318 has a porosity and an effective pore radius at a low end of a desired range. The fine vapor grooves shown in FIG. 12 can be formed in the free surface of the vaporization piece 1318. The thickness of the vaporization piece 1318 is about 0.015 of an inch to 0.030 of an inch, which includes the height of the vapor removal grooves.

Figure 14A:
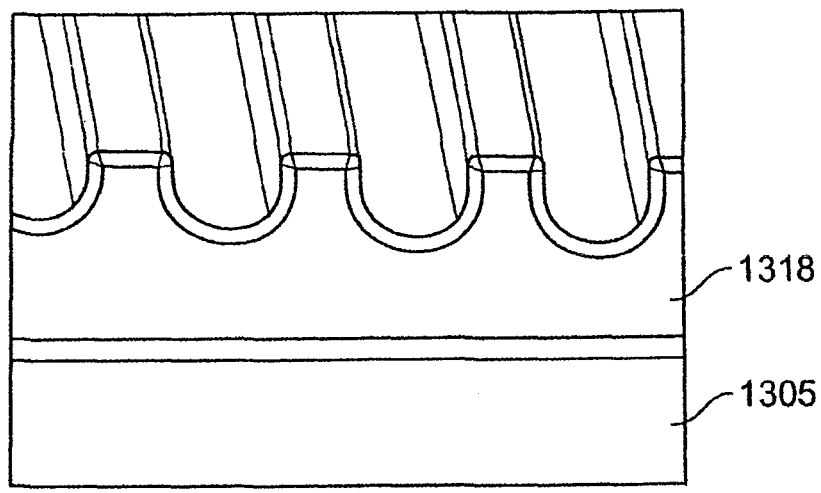
FIG. 14A is a cross-sectional view of an interface between a wick and a vapor barrier wall that can be used in the evaporator of FIG. 3.
Figure 14B:
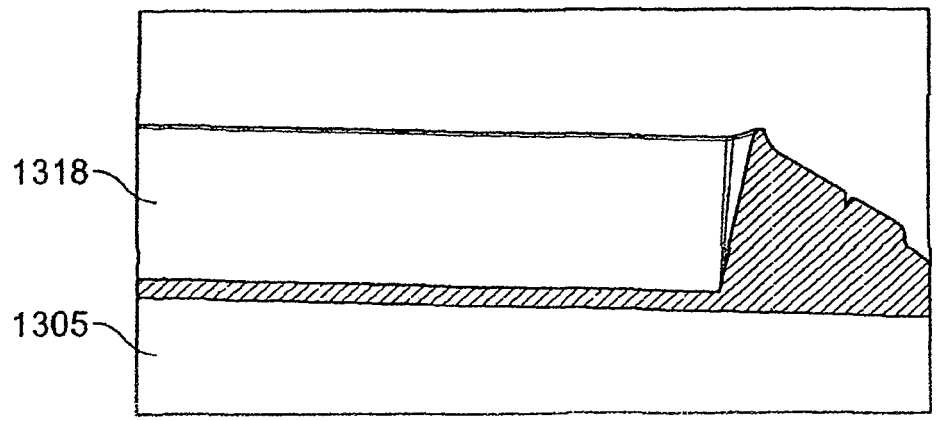
FIG. 14B is a cross-sectional view of an interface between a wick and a vapor barrier wall that can be used in the evaporator of FIG. 3.

As shown in FIGS. 14A and 14B, for example, the vaporization piece 1318 (that is, the high density piece of the wick 1315) is braze bonded to the vapor barrier wall 1305, such that the grooves are contained within the wick 1315 and do not open directly adjacent the vapor barrier wall 1305. Referring to FIGS. 12 and 13, the supply piece 1319 may be made of a low thermal conductivity material and have a porosity and effective pore radius at the high end of a preferred range. The supply piece 1319 may include coarse vapor grooves 1321 that are formed in the surface of the supply piece 1319 at the interface with the vaporization piece 1318 and at an orientation that is perpendicular to the fine vapor grooves (which cannot be seen in the cross-sectional view of FIG. 13 but are visible in the perspective view of FIG. 12). Including the thickness of the coarse grooves, the thickness of the supply piece 1319 is in the range of about 0.040 of an inch to 0.250 of an inch.

Figure 15:
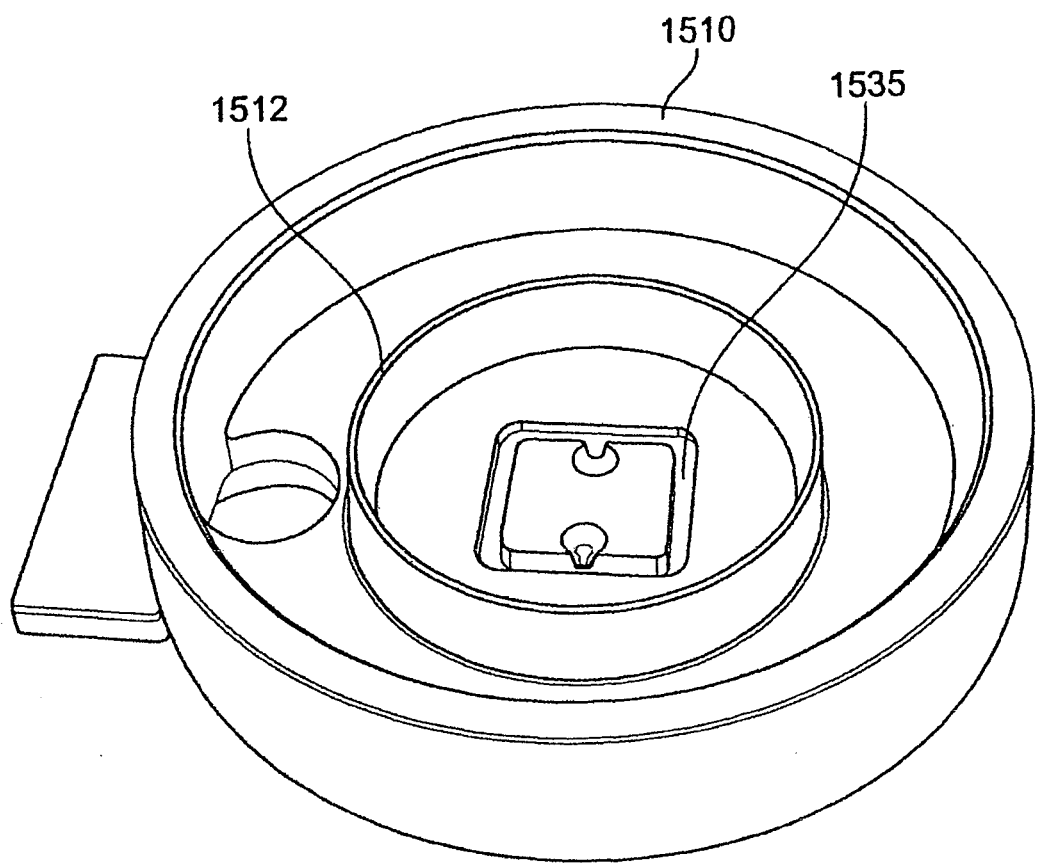
FIG. 15 is a perspective view of a liquid barrier wall that can be used in the evaporator of FIG. 3.

Referring to FIG. 15, a liquid barrier wall 1510 may also contain a ring-shaped feature 1512 for holding a wick (not shown) in place during assembly. The feature 1512 can also aid in bonding the wick to the liquid barrier wall 1510. In this implementation, a liquid flow channel 1535 has a generally square shape as it winds across the interface between the wick and the liquid barrier wall 1510.

Figure 16:
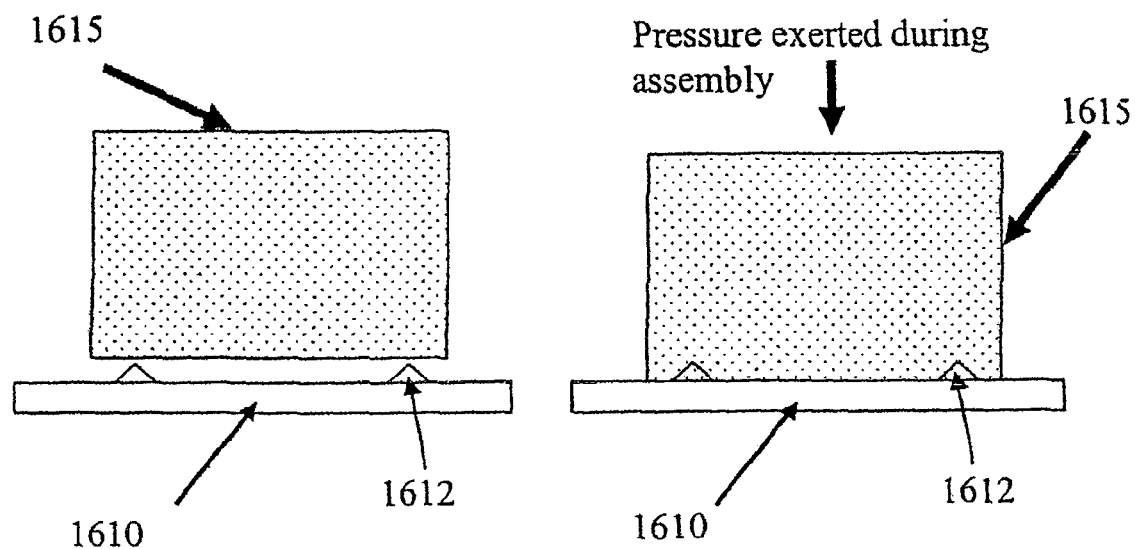
FIG. 16 is a schematic diagram showing assembly of a wick and a liquid barrier wall that can be used in the evaporator of FIG. 3.

Referring to FIG. 16, the liquid barrier wall 1610 may include a knife-edge feature 1612 on an interior surface of the liquid barrier wall 1610 that the wick 1615 mates with. When the wick 1615 is compressed against the liquid barrier wall 1610, the knife-edge feature 1612 causes a localized crushing of the wick 1615, which provides a degree of sealing to prevent liquid from leaking to the vapor side of the assembly and vapor from leaking to the liquid side.

For a hybrid loop heat pipe evaporator, the liquid flow channel may be one channel between the two ports or may be multiple parallel channels extending from the first liquid port to the second liquid port.

The liquid barrier wall may contain only a single liquid port if the evaporator is designed for a capillary pumped loop or for a loop heat pipe system, or the liquid barrier wall may contain both an inlet liquid port (such as the first liquid port) and an outlet liquid port (such as the second liquid port), if designed for a hybrid loop heat pipe system.

Referring to FIG. 3, the vapor outlet port 370 can be situated in a side of the liquid barrier wall 310 or in a cavity wall of the vapor barrier wall 305. As mentioned, the only limitation on the location of the vapor outlet port 370 is that it be located such that it opens into the space between the wick 315 and the cavity walls of the liquid barrier wall 310, such that vapor from the vapor removal channels 330 can reach the vapor outlet port 370.

As an alternative to stereolithography, the liquid barrier wall can be made using injection molding or green machining.

The evaporator having a thermal expansion coefficient that matches that of the heat source can be a cylindrical shape, like the evaporator 100 of FIG. 1. Such an evaporator could be used to cool cylindrically shaped heat sources.

The evaporator can be designed with a liquid barrier wall and a wick, such that the heat source to be cooled acts as a vapor barrier wall when placed adjacent the wick.

The evaporator can have any suitable shape to accommodate shapes of variation in heat source surfaces. For example, the evaporator can have a cylindrical shape to accommodate a cylindrical heat source.

What is claimed is:

1. A method of making an evaporator, the method comprising:
    bonding a first side of a ceramic wick to a vapor barrier wall at an interface between the wick and the vapor barrier wall to form a wick/vapor assembly;
    bonding a second side of the ceramic wick opposing the first side to a liquid barrier wall at an interface between the wick and the liquid barrier wall using a glass sealing material, a metal braze sealing material, or a solder material;
    forming a vapor channel at the interface between the wick and the vapor barrier wall; and
    forming a liquid channel at the interface between the wick and the liquid barrier wall.

2. The method of claim 1, further comprising forming a port through the liquid barrier wall.

3. The method of claim 2, further comprising adhering a liquid line to a portion of the liquid barrier wall forming the port using an epoxy.

4. The method of claim 2, further comprising sealing a liquid line to a portion of the liquid barrier wall forming the port using a solder, a glass, or a braze.

5. The method of claim 1, further comprising forming the liquid barrier wall using stereolithography.

6. The method of claim 1, further comprising forming the vapor barrier wall using stereolithography.

7. The method of claim 1, wherein bonding a second side of the ceramic wick to a liquid barrier wall comprises bonding the liquid barrier wall comprising a ceramic material to the second side of the ceramic wick.

8. The method of claim 1, further comprising selecting the liquid barrier wall to exhibit an at least substantially planar inner side positioned adjacent the wick.

9. The method of claim 1, wherein bonding a ceramic wick to a vapor barrier wall comprises bonding the ceramic wick to the vapor barrier wall comprising a ceramic material.

10. A method of making an evaporator, the method comprising:
    disposing a wick comprising a ceramic material between a substantially planar vapor barrier wall comprising a ceramic material and a substantially planar liquid barrier wall comprising a ceramic material;

forming a plurality of vapor channels at an interface between the wick and the vapor barrier wall on a first side of the wick; and forming a liquid channel at an interface between the wick and the liquid barrier wall on a second side of the wick opposing the first side.

11. The method of claim 10, further comprising:
bonding the ceramic wick to the liquid barrier wall; and
bonding the ceramic wick to the vapor barrier wall.

12. The method of claim 11, further comprising:
forming the liquid barrier wall from a ceramic material; and
forming the vapor barrier wall from a ceramic material.

13. The method of claim 10, wherein forming a plurality of vapor channels at an interface between the wick and the vapor barrier wall comprises forming the plurality of vapor channels in the wick.

14. The method of claim 10, wherein forming a plurality of vapor channels at an interface between the wick and the vapor barrier wall comprises forming the plurality of vapor channels in the vapor barrier wall.

15. The method of claim 10, wherein forming a plurality of vapor channels at an interface between the wick and the vapor barrier wall comprises forming the plurality of vapor channels in both the wick and the vapor barrier wall.

16. The method of claim 10, wherein forming a liquid channel at an interface between the wick and the liquid barrier wall comprises forming the liquid channel in the wick.

17. The method of claim 10, wherein forming a liquid channel at an interface between the wick and the liquid barrier wall comprises forming the liquid channel in the liquid barrier wall.

18. The method of claim 10, wherein forming a liquid channel at an interface between the wick and the liquid barrier wall comprises forming the liquid channel in both the wick and the liquid barrier wall.

19. The method of claim 10, wherein forming a liquid channel at an interface between the wick and the liquid barrier wall comprises forming the liquid channel to exhibit a trapezoidal shape along a cross-section normal to fluid flow to facilitate separation of vapor from liquid.

20. The method of claim 10, further comprising forming at least one fluid port extending through the liquid barrier wall to a portion of the liquid channel.

21. The method of claim 10, further comprising forming at least one of the vapor barrier wall and the wick to be electrically insulating.

22. A method of making an evaporator, the method comprising:
bonding a first side of a ceramic wick to a vapor barrier wall to faun a wick/vapor assembly;
bonding a second side of the ceramic wick opposing the first side to a liquid barrier wall using a glass sealing material, a metal braze sealing material, or a solder material;
forming a vapor channel at an interface between the wick and the vapor barrier wall;
forming a liquid channel at an interface between the wick and the liquid barrier wall; and
selecting the liquid barrier wall to comprise an annular wall formed within the evaporator and receiving the wick at least partially within the annular wall.

23. The method of claim 1, further comprising selecting the liquid barrier wall to exhibit a thermal conductivity that is less than the thermal conductivity of at least one of the wick and the vapor barrier wall.

24. The method of claim 1, further comprising selecting the wick to exhibit a thermal conductivity that is less than the thermal conductivity of the vapor barrier wall.

* * * * *

UNITED STATES PATENT AND TRADEMARK OFFICE
CERTIFICATE OF CORRECTION

PATENT NO. : 8,549,749 B2
APPLICATION NO. : 12/960298
DATED : October 8, 2013
INVENTOR(S) : Walter R. Zimbeck et al.

Page 1 of 1

It is certified that error appears in the above-identified patent and that said Letters Patent is hereby corrected as shown below:

In the claims:
CLAIM 22, COLUMN 16, LINE 16, change "to faun" to --to form--

Signed and Sealed this
Fourth Day of August, 2015

Michelle K. Lee
*Director of the United States Patent and Trademark Office*